United States Patent [19]
Nally et al.

[11] Patent Number: 5,740,383
[45] Date of Patent: Apr. 14, 1998

[54] DYNAMIC ARBITRATION PRIORITY

[75] Inventors: Robert Marshall Nally; Pete Edward Nelsen, both of Plano; Douglas Hamilton, Allen; Douglas Michael Berk, Plano, all of Tex.

[73] Assignee: Cirrus Logic, Inc., Fremont, Calif.

[21] Appl. No.: 577,351

[22] Filed: Dec. 22, 1995

[51] Int. Cl.⁶ .................................................. G06F 13/00
[52] U.S. Cl. ........................................... 395/296; 711/151
[58] Field of Search ................................ 395/736, 738, 395/729, 732, 859, 860, 861, 844, 296, 478, 877; 711/151

[56] References Cited

U.S. PATENT DOCUMENTS

| | | |
|---|---|---|
| 4,281,381 | 7/1981 | Ahuja et al. . |
| 4,493,036 | 1/1985 | Boudreau et al. .................... 395/732 |
| 4,621,342 | 11/1986 | Capizzi et al. . |
| 4,791,563 | 12/1988 | Kling . |
| 5,034,881 | 7/1991 | Hoashi et al. . |
| 5,072,420 | 12/1991 | Conley et al. ....................... 395/877 |
| 5,088,024 | 2/1992 | Vernon et al. . |
| 5,195,185 | 3/1993 | Marenin . |
| 5,303,382 | 4/1994 | Buch et al. ......................... 395/732 |
| 5,339,443 | 8/1994 | Lockwood . |
| 5,467,454 | 11/1995 | Sato .................................... 395/296 |
| 5,473,756 | 12/1995 | Traylor ................................ 395/250 |
| 5,487,170 | 1/1996 | Bass et al. ........................... 395/732 |
| 5,524,235 | 6/1996 | Larson et al. ....................... 395/478 |

*Primary Examiner*—Glenn A. Auve
*Attorney, Agent, or Firm*—David H. Tannenbaum; Stuart J. Ford; Steven A. Shaw

[57] ABSTRACT

An arbitration controller that temporarily raises the priority of a graphic device's HWM request above that of the BitBLT engine while that device's LWM request is being served. In this manner, the BitBLT engine cannot interrupt the transfer of data to the graphics device. Each device capable of issuing memory access requests is categorized into one of four classes. The LWM requests are the highest priority requests, followed by CPU memory access requests, then BitBLT engine requests, and finally by HWM requests. When a LWM request is granted, the requesting device's HWM request is elevated to a priority between the CPU and the BitBLT engine. Once the LWM request is complete, the HWM request is served until either it completes, the CPU issues a memory access request, or another LWM request occurs.

42 Claims, 5 Drawing Sheets

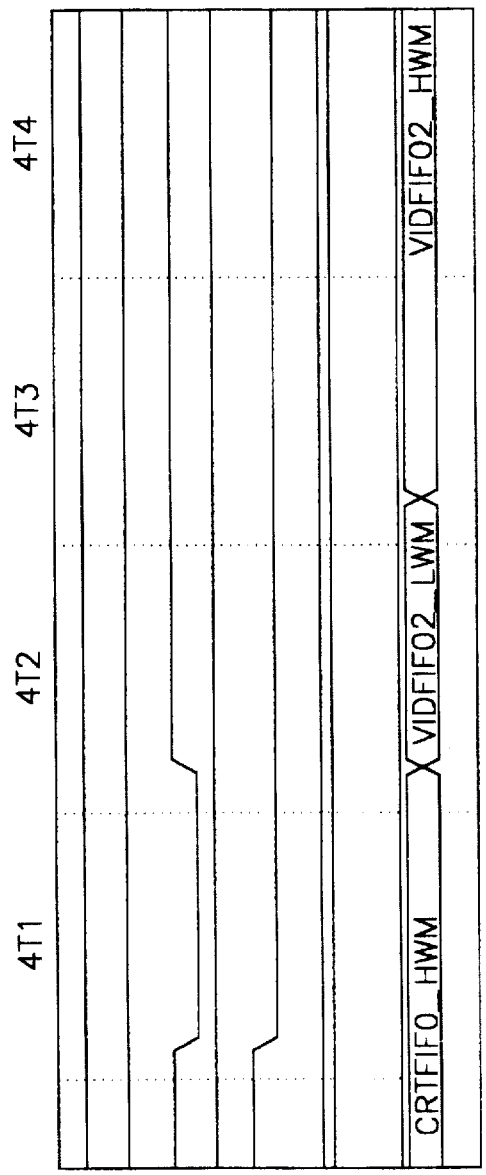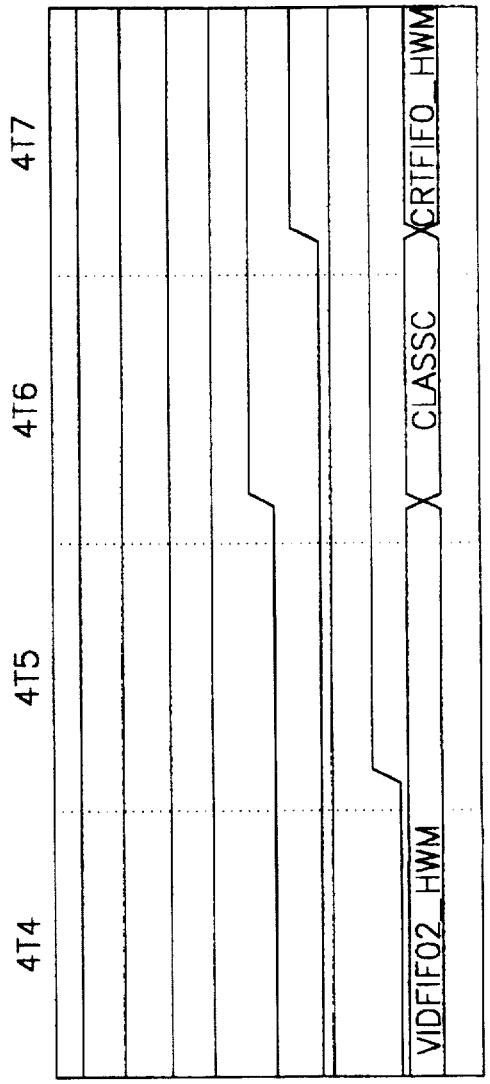
FIG. 4A
FIG. 4B

DYNAMIC ARBITRATION PRIORITY

RELATED APPLICATIONS

This application is related to the following three co-pending, commonly assigned U.S. applications, each of which are hereby incorporated by reference herein:

Ser. No. 08/577,584, SDRAM MEMORY CONTROLLER WITH MULTIPLE ARBITRATION POINTS, filed Dec. 22, 1995; Ser. No. 08/579,068, SDRAM MEMORY CONTROLLER SUPPORTING SINGLE DATA ACCESSES, filed Dec. 22, 1995; and Ser. No. 08/577,579, SDRAM DIMM PRESENCE DETECT INTERFACE, filed Dec. 22, 1995.

TECHNICAL FIELD OF THE INVENTION

The present invention pertains in general to a computer having a unified memory architecture and more particularly to memory arbitration circuitry in such a computer.

BACKGROUND OF THE INVENTION

A computer having a unified memory architecture (UMA) has a single main memory accessed by all system devices, including a central processing unit (CPU) and a graphics controller. Each device accesses memory by issuing memory access requests having certain priorities. Arbitration circuitry arbitrates among the memory access requests and grants access to the requesting device having the highest priority.

There are four devices related to the graphics controller that can issue memory access requests: CRT FIFO, VID FIFO 1, VID FIFO 2, and the BitBLT engine. The first three devices have two levels of memory access request signals: low water mark (LWM) and high water mark (HWM). The HWM signal indicates that the device could accept more data. The LWM signal is a critical request and indicates that the device might run out of data. A memory access request signal from the fourth device, the BitBLT engine, has a priority greater than HWM requests but less than LWM requests.

A graphics device will always issue a HWM signal before a LWM signal. This order is because the device will issue a HWM signal when it can accept more data, then issue a LWM signal when its need for data becomes critical. Once the device is granted memory access, its LWM signal may quickly go inactive. The device's HWM signal, however, will stay active until the device cannot accept any more data.

Since graphics data typically occupies consecutive memory addresses and the memory hardware is optimized to support fast transfers of consecutive data, it is advantageous to let the device continue memory access until its HWM signal goes inactive. When the BitBLT engine issues a memory access request while a graphics device's LWM request is being fulfilled, however, the BitBLT engine's request is granted as soon as the LWM signal goes inactive. Thus, the BitBLT engine interrupts the transfer of data from memory to the graphics device. This interruption decreases total memory throughput.

Therefore, there is a need in the art for a memory arbitration controller that efficiently arbitrates memory access requests. More particularly, there is a need for a memory controller that allows a device signalling a LWM to continue accessing memory until its HWM signal goes inactive.

SUMMARY OF THE INVENTION

The above and other needs are met by an arbitration controller that temporarily raises the priority of a graphic device's HWM request above that of the BitBLT engine while that device's LWM request is being served. In this manner, the BitBLT engine cannot interrupt the transfer of data to the graphics device.

Each device capable of issuing memory access requests is categorized into one of four classes. The LWM requests are the highest priority requests, followed by CPU memory access requests, then BitBit engine requests, and finally by HWM requests. When a LWM request is granted, the requesting device's HWM request is elevated to a priority between the CPU and the BitBLT engine. Once the LWM request is complete, the HWM request is served until either it completes or the CPU or one of the other LWM issues a memory access request.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a timing chart illustrating a HWM request being temporarily elevated above a higher priority BitBLT request.

FIG. 6 illustrates how to combine FIGS. 4 and 5.

DESCRIPTION OF THE PREFERRED EMBODIMENTS

Figure 1:
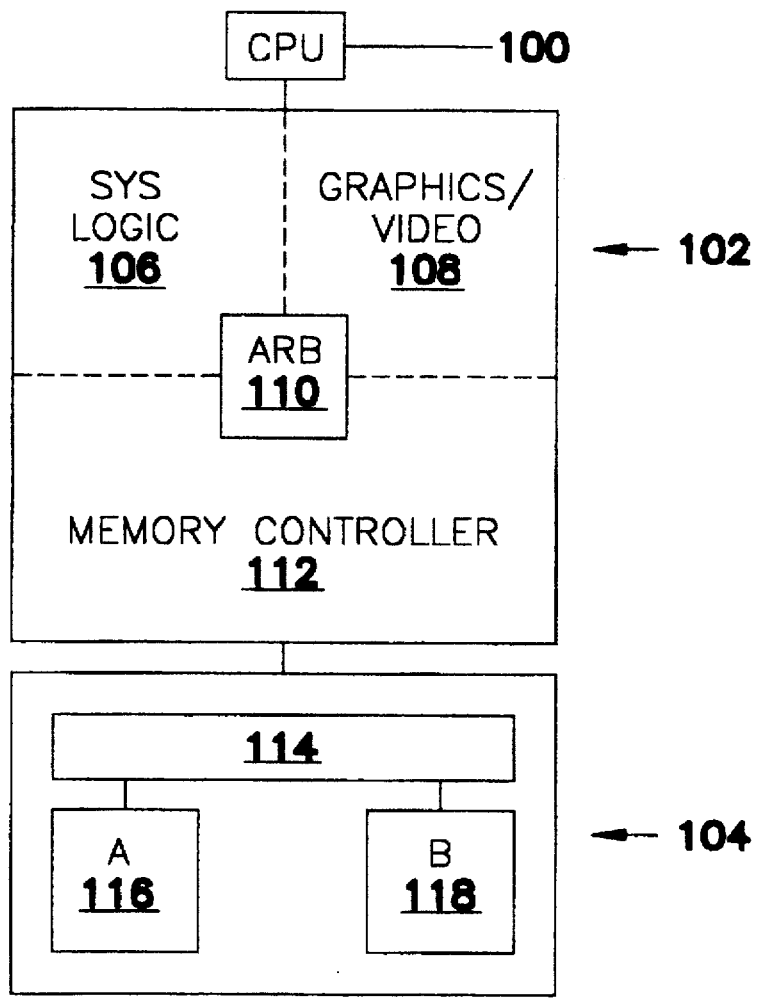
FIG. 1 illustrates a high-level functional block diagram of a computer system having a unified memory architecture.

FIG. 1 illustrates a high-level functional block diagram of a computer system having a unified memory architecture (UMA) according to the present invention. Shown are central processing unit (CPU) 100 coupled to integrated controller 102. Integrated controller 102, in turn, is coupled to synchronous dynamic random access memory (SDRAM) 104.

CPU 100 is preferably an X86 compatible CPU. However, the present invention will work equally well with any standard CPU capable of issuing memory access requests as described below.

Integrated controller 102 contains system logic 106, graphics/video controller (hereafter referred to as "graphics controller") 108, arbitration logic 110, and memory controller 112. System logic 106 contains the logic necessary to control the basic operation of the computer system, such as bus logic. Graphics controller 108 controls the generation of graphics data on a display screen (not shown). Graphics controller 108 may receive video data from a real-time video source separate from the computer system or display graphics data received from CPU 100.

Arbitration logic 110 receives memory requests from the CPU 100, system logic 106, and graphics controller 108. Then, arbitration logic 110 arbitrates among and grants the highest priority request. Once a device's access request is granted, that device is connected directly to memory controller 112 and uses it 112 to access memory.

It is important to note that arbitration logic 110 arbitrates among all devices in the computer system capable of issuing memory access requests. As discussed above, these devices include the CPU 100 and graphics controller 108. In addition, devices such as peripheral cards, DMA controllers, separate video controllers, and multimedia adapters can send memory access requests to arbitration logic 110 via system logic 106.

SDRAM 104 includes digital interface 114 and has two banks of DRAM: bank A 116 and bank B 118. To access DRAM banks 116 and 118, commands are sent to digital interface 114. Digital interface 114 translates the commands into regular DRAM bus cycles and then accesses DRAM banks 116, 118.

Figure 2:
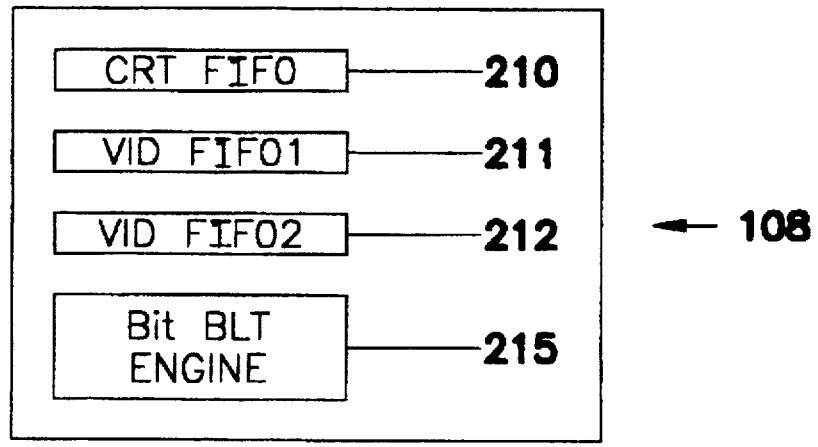
FIG. 2 illustrates a functional block diagram of the operative components of a graphics controller.

FIG. 2 shows a functional block diagram of the operative components of graphics controller 108. Shown are three FIFOs, or buffers: CRT FIFO 210, VID FIFO1 211, and VID FIFO2 212. In addition, graphics controller 108 contains BitBLT engine 215.

CRT FIFO 210 holds graphics data being read out of memory for display on the display screen. CFT FIFO 210 must have a high priority because the screen will be corrupted if it 210 runs empty. VID FIFO1 211 reads data from memory. VID FIFO2 212 can read data from or write data to memory. Thus, VID FIFO2 212 is used for video capture. When video data is coming in from an external source like a tuner or RCA jack from a VCR or similar device, the data will come into VID FIFO2 212 and be written to display memory. Note that the FIFOs 210-212 usually read or write large blocks of contiguous data due to the nature of graphics/video processing. BitBLT engine 215 is a logical construct used to accelerate the block transfer of data on the computer screen.

Figure 3:
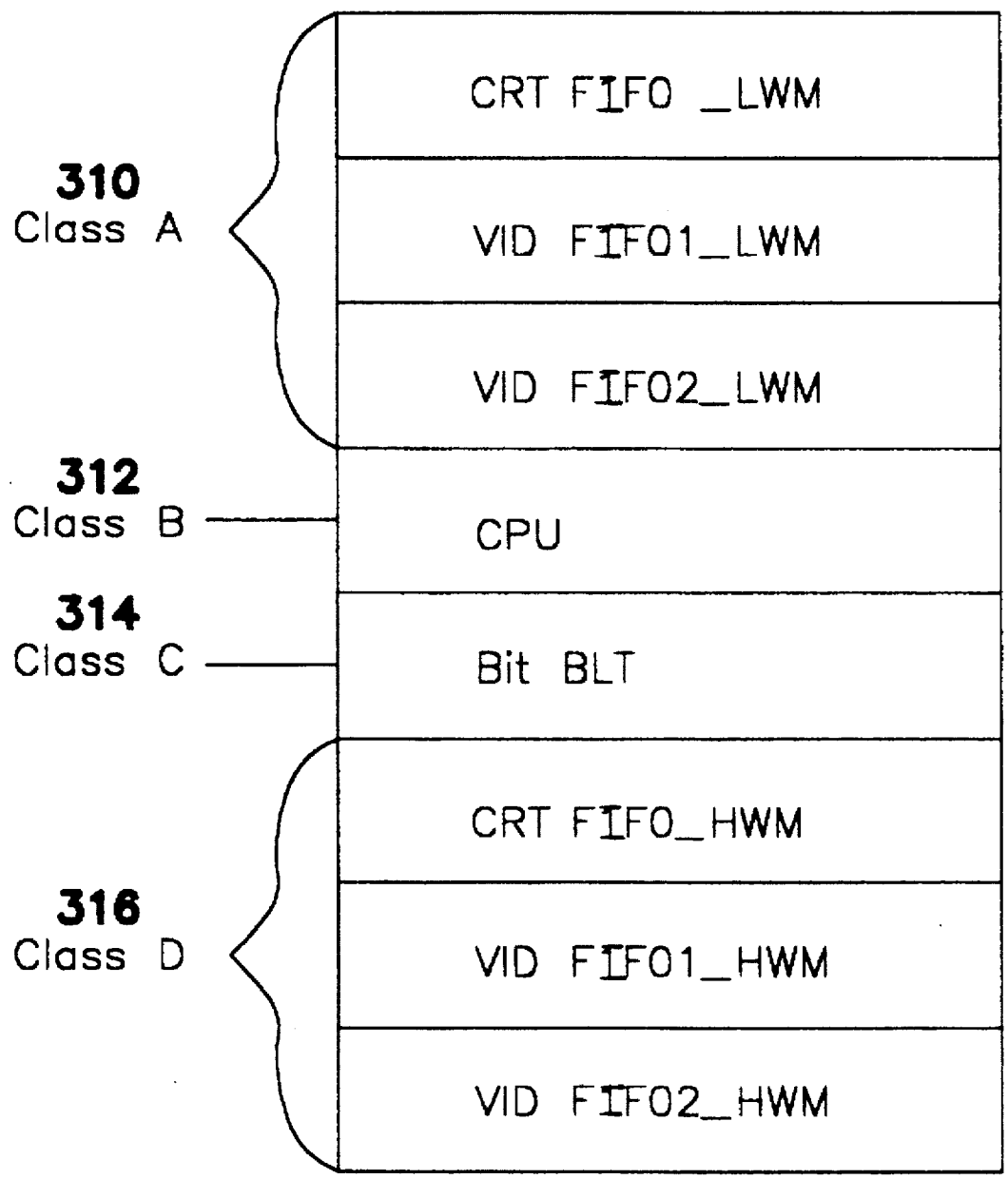
FIG. 3 is a chart showing the relative priority of memory requests.

FIG. 3 is a chart showing the relative priority of memory requests from CRT FIFO 210, VID FIFO1 211, VID FIFO2 212, CPU 100, and BitBLT engine 215. The memory requests are grouped, in descending order of priority, as Class A 310, Class B 312, Class C 314, and Class D 316 requests.

Class A 310 requests are the highest priority requests and include the CRT FIFO 210, VID FIFO1 211, and VID FIFO 212 low water mark (LWM) requests. A LWM request, or signal, is a critical request and indicates that the FIFO 210-212 is about to run out of data. Note that VID FIFO2 212 can either read or write data. Therefore, VID FIFO2 212's LWM can indicate that either the FIFO 212 is starting to get empty or the FIFO 212 is starting to get full.

Class B 312 requests include the CPU 100 requests. In addition, any bus mastering peripheral would have a class B 312 request when interfacing with memory 104. BitBLT engine 215 is the only class C 314 request.

Class D 316 requests are the lowest priority requests and include the CRT FIFO 210, VID FIFO1 211, and VID FIFO 212 high water mark (HWM) requests. A HWM request indicates that the FIFO 210-212 can accept more data. Once again, note that VID FIFO2 212 can either read or write data. Therefore, VID FIFO2 212's HWM can indicate that either the FIFO 212 can accept more data or can write more data.

The above-described request signals are arbitrated by arbitration circuitry 110. The function of arbitration circuitry 110 can be explained by considering its behavior with respect to CRT FIFO 210. Note that CRT FIFO 210 is selected only as an example.

When CRT FIFO 210 is totally full of data from memory 104, both its HWM and LWM requests are inactive. As data passes out of the FIFO 210 and to the display, the HWM request will eventually go active. As stated above, the HWM request indicates that some data has been taken out of the FIFO 210 and the FIFO 210 can accept more data. However, it is not critical that CRT FIFO 210 get data right away. Since only CRT FIFO 210's HWM request is active, the class A 310, B 312, and C 314 devices would get memory access ahead of CRT FIFO 210 if they were to go active.

As CRT FIFO 210 continues to empty, it eventually gets to the point where it trips the LWM request. Once CRT FIFO 210's LWM request goes active, it becomes the highest priority request and will be granted immediately. When the request is granted, the CRT FIFO 210 begins to read data from memory. Eventually, the CRT FIFO 210 becomes filled to the point where its LWM request goes inactive. At this point, it is desirable to allow the CRT FIFO 210 to fill to its HWM because memory 104 is optimized to quickly provide large amounts of consecutive data.

Therefore, a preferred embodiment of the arbitration circuitry elevates the priority of CRT FIFO 210's HWM request to a level between the class B 312 and class C 314 requests. This elevation occurs at the time that CRT FIFO 210's LWM goes active. The process of elevating the priority of the class D 316 request above a class C 314 request is called "chaining." In this manner, the CRT FIFO 210 can continue to fill to its HWM, unless a class A 310 device issues a LWM request or a class B 312 device issues a memory access request.

Note that the high and low water marks for a FIFO can be chosen to reflect the needs of the computer system. In addition, the high and low water marks for each FIFO can be set individually. Thus, the present invention does not require fixed points for the high and low water marks.

Figure 5A:
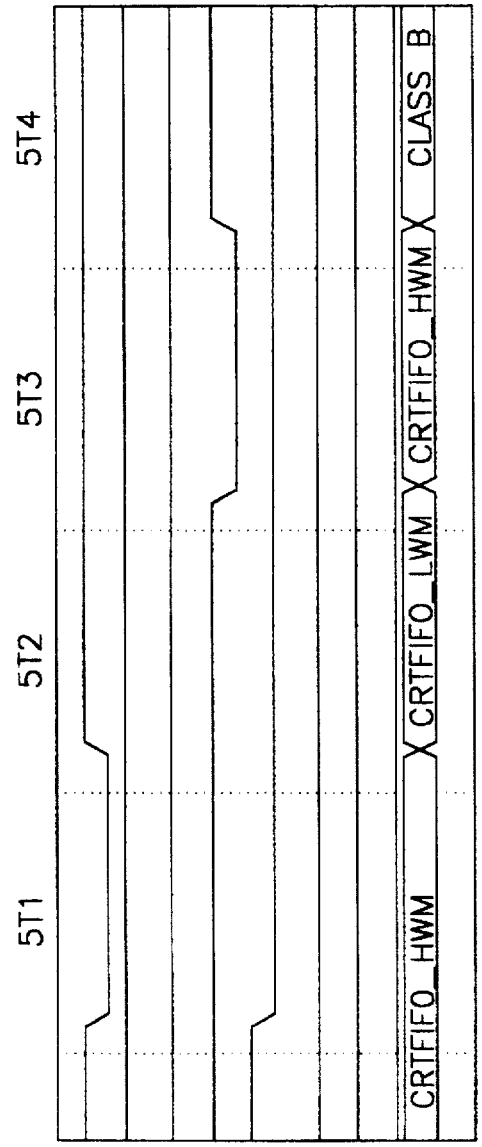
FIG. 5 is a timing chart illustrating a chained operation being broken by a higher priority CPU request.
Figure 5B:
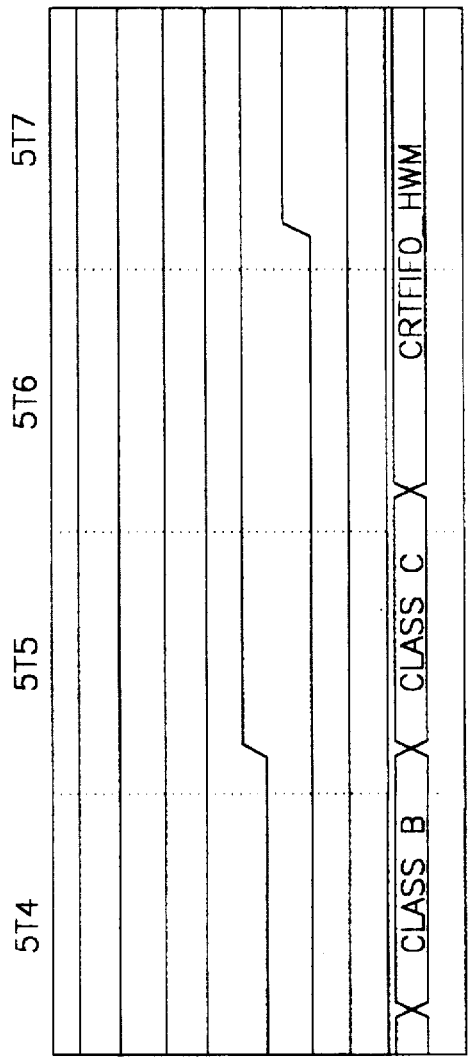

FIG. 4 is a timing chart illustrating a class D 316 request being elevated above a class C 314 request. FIG. 4 shows the CRTFIFO_LWM A, VIDFIFO1_LWM B, VIDFIFO2_LWM C, CLASS_B D, CLASS_C E, CRTFIFO_HWM F, VIDFIFO1_HWM G, VIDFIFO2_HWM H, and Granted G signals. Each signal, except for Granted G corresponds to a request signal shown in FIG. 3. Granted G shows which device has been granted memory access. Note that the signals in FIGS. 4 and 5 are active when low. In addition, note that cycles 4T4 and 5T4 are repeated in the 'A' and 'B' segments of FIGS. 4 and 5, respectively.

At time 4T1, the VIDFIFO2_LWM C, CRTFIFO_HWM F, and CLASS_C E signals are active. At time 4T2, Granted G indicates that VID FIFO2 212 has been granted memory access. In addition, VIDFIFO2_LWM C goes inactive at time 4T2, thereby indicating that the FIFO 212 has been filled past its LWM. At times 4T3 to 4T4, VIDFIFO2_HWM H continues its memory access, despite the active CLASS_C E request.

At time 4T5, VIDFIFO2_HWM H goes inactive, indicating that it is full past its HWM. Then, at time 4T6, the CLASS_C E request is granted and then goes inactive. Finally, at time 4T7, the CRTFIFO_HWM F request is granted. The arbitration behavior between times 4T2 and 4T5 is called a "chained operation" because the grant to VIDFIFO2_HWM H is "chained" to the grant to VIDFIFO2_LWM C.

FIG. 5 is a timing chart illustrating a chained operation being broken by a CLASS_B D request. FIG. 5 shows the CRTFIFO_LWM A, VIDFIFO1_LWM B, VIDFIFO2_LWM C, CLASS_B D, CLASS_C E, CRTFIFO_HWM F, VIDFIFO1_HWM G, VIDFIFO2_HWM H, and Granted G signals. The signals correspond to the signals in FIG. 4.

At time 5T1, the CRTFIFO_LWM A and CLASS_C E request signals are active along with all FIFO_HWM signals. At time 5T2, the CRTFIFO_LWM A request is granted. As a result, the CRTFIFO_LWM A signal goes inactive at time 5T2 because CRT FIFO 210 filled past its LWM. At time 5T3, the CRTFIFO_HWM F is granted memory access despite the active CLASS_C E request signal. Thus, 5T3 marks the beginning of the chained operation.

At time 5T3, the CLASS_B D request signal goes active. Since a CLASS_B D request has a higher priority than an elevated, or chained, CLASS_D 316 request, the CLASS_B D request is granted at time 5T4. This grant breaks the chain and returns CRTFIFO_HWM F to the class D 316 priority. At time 5T5 the CLASS_C E request is granted. Finally, at 5T6, the CRTFIFO_HWM F request is granted.

We claim:

1. Arbitration circuitry in a computer system, comprising:
   a first device having a predetermined high water mark and a predetermined low water mark associated therewith, first selected activity at the low water mark causing the first device to issue a first request having a first priority, second selected activity at the high water mark causing the first device to issue a second request having a second priority;
   circuitry for granting the first request; and
   circuitry for chaining the second request to the first request.

2. The arbitration circuitry of claim 1, wherein the chaining circuitry comprises:
   circuitry for elevating the second priority above a third priority of a third request from a second device.

3. The arbitration circuitry of claim 2, wherein the third request comprises class C request.

4. The arbitration circuitry of claim 2, wherein the second device comprises BitBLT engine.

5. The arbitration circuitry of claim 1, wherein the requests comprise memory access requests.

6. The arbitration circuitry of claim 1, wherein the first device comprises FIFO.

7. The arbitration circuitry of claim 1, wherein the first request comprises class A request.

8. The arbitration circuitry of claim 1, wherein the second request comprises class D request.

9. A method of arbitrating requests in a computer system, comprising the steps of:
   associating a predetermined high water mark and a predetermined low water mark with a first device;
   causing the first device to issue a first request upon first selected activity at the low water mark, the first request having a first priority;
   causing the first device to issue a second request upon second selected activity at the high water mark, the second request having a second priority;
   granting the first request; and
   chaining the second request to the first request.

10. The method of claim 9, wherein the chaining step comprises the step of:
    elevating the second priority above a third priority of a third request.

11. The method of claim 10, wherein the third request comprises class C request.

12. The method of claim 10, wherein the third request is issued by a BitBLT engine.

13. The method of claim 9, wherein the requests comprise memory access requests.

14. The method of claim 9, wherein the first request is issued by a FIFO.

15. The method of claim 9, wherein the first request comprises class A request.

16. The method of claim 9, wherein the second request comprises class D request.

17. Arbitration circuitry for arbitrating between first and second devices requesting memory access, comprising:
    means for associating a predetermined high water mark and a predetermined low water mark with a first device;
    means for causing the first device to issue a first memory access request upon first selected activity at the low water mark, the first request having a high priority;
    means for causing the first device to issue a second memory access request upon second selected activity at the high water marks the second request having a low priority;
    means for granting the first request; and
    means for temporarily elevating the second request above a medium priority memory access request from a second device.

18. The arbitration circuitry of claim 17, wherein the first device comprises FIFO.

19. The arbitration circuitry of claim 17, wherein the high priority request comprises class A request.

20. The arbitration circuitry of claim 17, wherein the low priority request comprises class D request.

21. The arbitration circuitry of claim 17, wherein the medium priority request comprises class C request.

22. The arbitration circuitry of claim 17, wherein the second device comprises BitBLT engine.

23. A method of arbitrating among a plurality of devices issuing memory access requests of differing priorities, comprising the steps of:
    causing a first device to issue a high priority memory access request;
    granting the high priority memory access request;
    receiving a medium priority memory access request from a second device;
    receiving a low priority memory access request from the first device; and
    elevating the low priority memory access request in priority above the medium priority memory access request.

24. The method of claim 23, wherein the first device comprises FIFO.

25. The method of claim 23, wherein the second device comprises BitBLT engine.

26. The method of claim 23, wherein the high priority memory access request comprises class A request.

27. The method of claim 23, wherein the medium priority memory access request comprises class C request.

28. The method of claim 23, wherein the low priority memory access request comprises class D request.

29. Arbitration circuitry in a computer system, comprising:
  circuitry for granting a first request having a first priority from a first device, wherein the first device comprises FIFO; and
  circuitry for chaining a second request having a second priority to the first request.

30. The arbitration circuitry of claim 29, wherein the chaining circuitry comprises:
  circuitry for elevating the second priority above a third priority of a third request from a second device.

31. The arbitration circuitry of claim 30, wherein the third request comprises class C request.

32. The arbitration circuitry of claim 30, wherein the second device comprises BitBLT engine.

33. The arbitration circuitry of claim 29, wherein the requests comprise memory access requests.

34. The arbitration circuitry of claim 29, wherein the first request comprises class A request.

35. The arbitration circuitry of claim 29, wherein the second request comprises class D request.

36. A method of arbitrating requests in a computer system, comprising the steps of:
  granting a first request having a first priority, wherein the first request is issued by a FIFO; and
  chaining a second request having a second priority to the first request.

37. The method of claim 36, wherein the chaining step comprises the step of:
  elevating the second priority above a third priority of a third request.

38. The method of claim 37, wherein the third request comprises class C request.

39. The method of claim 37, wherein the third request is issued by a BitBLT engine.

40. The method of claim 36, wherein the requests comprise memory access requests.

41. The method of claim 36, wherein the first request comprises class A request.

42. The method of claim 36, wherein the second request comprises class D request.

* * * * *